United States Patent [19]
Stoy et al.

[11] Patent Number: 5,415,195
[45] Date of Patent: May 16, 1995

[54] METHOD AND APPARATUS FOR CONTROLLING PHASE SPLITTING AT BRANCH T PIPE JUNCTIONS

[75] Inventors: James R. Stoy, Missouri City, Tex.; Eric L. Berger, Bakersfield, Calif.; Edward A. Woerheide; James L. G. Schrodt, both of Houston, Tex.

[73] Assignee: Texaco Inc., White Plains, N.Y.

[21] Appl. No.: 206,708

[22] Filed: Mar. 7, 1994

[51] Int. Cl.6 .......................................... F16L 41/02
[52] U.S. Cl. .................................. 137/8; 137/561 A; 137/599
[58] Field of Search .................. 137/8, 561 A, 599

[56] References Cited

U.S. PATENT DOCUMENTS

| | | | |
|---|---|---|---|
| 4,516,986 | 5/1985 | Jepsen | 137/110 X |
| 4,522,218 | 6/1985 | Koriak | 137/599 X |
| 4,574,837 | 3/1986 | Aggour et al. | 137/561 A |
| 5,218,985 | 6/1993 | Berger et al. | 137/8 |
| 5,250,104 | 10/1993 | Berger et al. | 137/516 A X |

Primary Examiner—Gerald A. Michalsky
Attorney, Agent, or Firm—James L. Bailey; Kenneth R. Priem; William J. Beard

[57] ABSTRACT

Unequal phase splitting at branch T pipe junctions, wherein the branch line is of substantially lesser diameter than the main line, is substantially eliminated by structure (either a weir or sump) in the main line which collects at least a portion of the liquid phase and a bypass line which connects the weir or sump to the branch line downstream of a constriction creating a reduced pressure section in the branch pipe.

8 Claims, 1 Drawing Sheet

METHOD AND APPARATUS FOR CONTROLLING PHASE SPLITTING AT BRANCH T PIPE JUNCTIONS

BACKGROUND OF THE INVENTION

1. The Field of the Invention

The present invention relates to a method and apparatus for controlling phase splitting of gas-liquid mixtures flowing through reducing branch T pipe junctions and, in particular, to a method and apparatus which will assure that the reduced diameter branch will not receive virtually dry vapor.

2. The Prior Art

Phase splitting is a phenomenon of two phase vapor (or gas) and liquid flow which exists at all piping junctions, such as impact T-junctions, branch T-junctions, Y-junctions, crosses, etc. In branch T-junctions, especially those with reduced diameter branch piping, the liquid and vapor phases do not normally divide into two streams of equal vapor-liquid proportions. This is important, for example, in wet steam distribution systems where it is desirable to deliver nearly equal steam quality throughout the distribution system. Steam quality is a measure of the proportion of the total mass that is vapor. The vapor extraction ratio is defined below.

Vapor Extraction Ratio is, $$F_{g3} = \frac{M_{v3}}{M_{v3} + M_{v2}} = \frac{M_{v3}}{M_{v1}}$$

Where, $F_g$ = Vapor Extraction Ratio
$M_{v1}$ = Inlet mass rate of the vapor phase
$M_{v2}$ = Outlet branch 2 mass rate of vapor phase
$M_{v3}$ = Outlet branch 3 mass rate of vapor phase Numerous studies investigating phase splitting have been conducted and various devices to equalize or control phase splitting have been tried. Some examples of these devices can be found in U.S. Pat. Nos. 5,218,985; 5,250,104; and 5,251,662, the disclosures of which are incorporated herein by reference. However, only a few of these ideas have been implemented in the design of new steam distribution systems and none have become standard practice throughout the industry. Still fewer of these methods to minimize or control phase splitting are encountered in distribution systems which were built before phase splitting was widely understood. Methods to control phase splitting must be simple, easy to operate (or require no operator action), create minimal pressure drop, be inexpensive, and be effective.

An example of where the present invention would be particularly useful is thermally enhanced recovery of hydrocarbons from marginal fields or heavy oil reserves that require a degree of thermal stimulation to achieve satisfactory flow of crude petroleum. In such operations steam is sent through a patterned array of injection wells to heat the formation being treated and drive the hydrocarbons towards a production well. The steam quality will directly affect the formation heatup effect and thus the recovery operation. The vapor phase of the steam delivers the most heat and therefore has the greatest effect on performance of the hydrocarbon recovery effort. Thus it is desirable to have steam of uniform quality injected into all portions of the reservoir.

There is a need for a simple method and apparatus to control the phase splitting which occurs in wet steam distribution systems and particularly at reduced branch T-junctions within such distribution systems. These junctions are common in older oilfield steam distribution systems which were constructed before the disadvantages of this type of junction configuration were fully understood.

It can be appreciated that steam will normally leave the steam generator, or source, at a known quality, pressure and mass flow rate. As the pressurized steam flow progresses through the distribution system, a generally annular separation of the steam to its liquid and gaseous phases is likely to occur with the lighter and faster vapor phase moving substantially axially through the system while the heavier slower liquid phase tends to become annular in shape and adhere to the piping walls. Though the liquid phase is moving at a lower velocity than the vapor phase, it travels with a significantly higher momentum flux due to its much higher density. The fact that the liquid's momentum is higher than that of the vapor causes the liquid to be much more reluctant to change direction, as would be required for steam of undiminished quality to enter the branch of a reduced branch T-junction. The liquid's momentum tends to carry it directly across the branch opening, so that the fluid flow into the branch will be virtually all vapor and very little, if any, liquid.

SUMMARY OF THE INVENTION

The present invention substantially eliminates unequal phase splitting at branch T pipe junctions and automatically compensates for changes in the vapor extraction ratio. It also allows for control of phase splitting when unequal steam quality splits are desired and introduces no additional pressure drop in the straight-through run of the junction. The invention functions by directing a quantity of the liquid phase through a liquid bypass conduit to the branch leg of the piping junction and recombining the liquid phase with the vapor phase in the reduced diameter branch at a point downstream of the pipe junction in proportion to the vapor extraction ratio at the junction.

BRIEF DESCRIPTION OF THE DRAWINGS

The present invention will now be described, by way of example, with reference to the accompanying drawings in which.

DESCRIPTION OF A PREFERRED EMBODIMENT OF THE INVENTION

Figure 1:
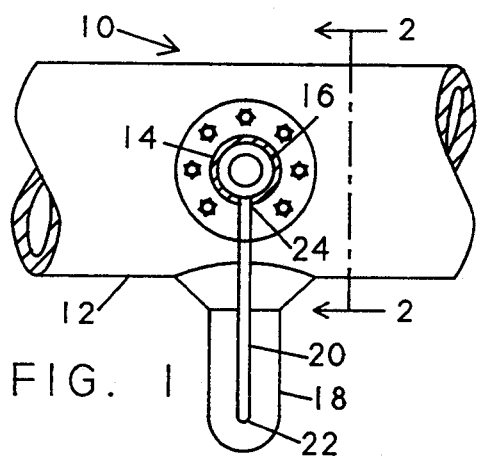
FIG. 1 is a side elevation of a first embodiment of the present invention.
Figure 2:
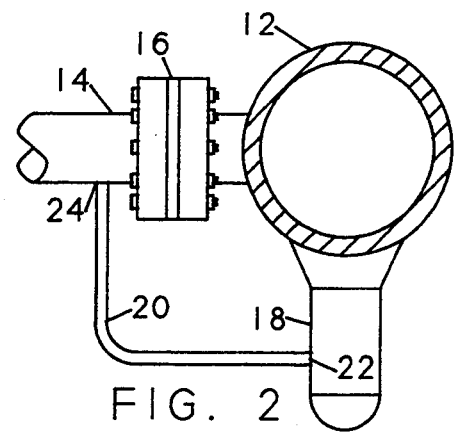
FIG. 2 is a vertical section taken along line 2—2 of FIG. 1.

Turning first to FIGS. 1 and 2, the first embodiment of the subject invention 10 is associated with a straight-through section of large diameter pipe 12, from which a fraction of the flow is removed through a smaller diameter branch outlet pipe 14 extending generally perpendicular to the straight-through section 12. A known flow constriction 16, such as the illustrated orifice (or a venturi not shown), is located within the smaller diameter branch outlet pipe 14 spaced from the junction. A sump 18 depends from the straight-through section 12 generally opposite the opening to the branch outlet pipe 14. A liquid bypass pipe 20 has one end connected to a takeoff point 22 located near the bottom of the sump 18 and its other end connected to a point 24 on the branch outlet pipe 14 downstream of the flow constriction 16. The length and inside diameter of the liquid bypass pipe 20 are designed such that the friction pressure drop of the liquid flowing through the bypass pipe 20 equals the pressure drop of the vapor flowing through the branch outlet flow constriction 16 at nominal design vapor extraction ratio. Because the friction pressure drop of the liquid in the bypass pipe 20 and the constriction 16 induced pressure drop of the vapor are both porportional to the square of the velocity of the flowing media, the system is self-compensating for changes in vapor extraction ratio. The liquid-vapor mass ratio at the exit to the branch outlet pipe 14 remains constant in spite of changes in extraction ratio.

Figure 3:
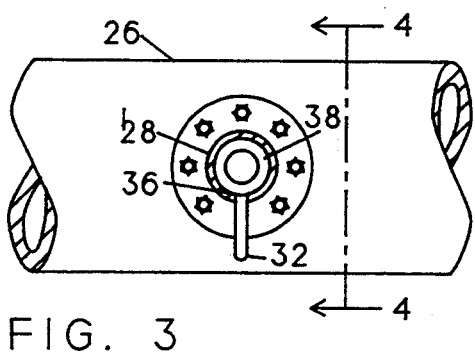
FIG. 3 is a side elevation of an alternate embodiment of the present invention.
Figure 4:
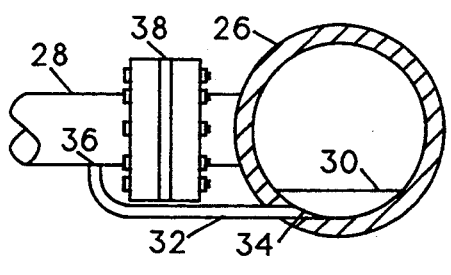
FIG. 4 is a section taken along line 4—4 of FIG. 3.

The alternate embodiment of the present invention, FIGS. 3 and 4, has a main straight-through large diameter pipe 26, a smaller diameter branch pipe 28 extending generally perpendicular to the pipe 26, a weir 30 located spaced downstream of the opening to the branch outlet pipe 28, and a liquid bypass pipe 32 having one end connected to the pipe 26 at a point 34 upstream of the weir 30 and its other end connected to a point 36 in the branch pipe line 28 downstream of the flow constriction 38. The bypass pipe of this embodiment must meet the same criteria as above described for the bypass pipe of the first embodiment.

As the liquid-vapor fluid mixture passes through the straight-through section of main pipe 12, 26, a fraction of the liquid phase accumulates in the sump 18 (or upstream of the weir 30). The natural behavior of the reduced diameter branch outlet is such that essentially dry vapor is extracted from the mixture flowing through the straight-through section of pipe. The dry vapor flowing through the constriction 16, 38 creates a reduction in pressure downstream of the constriction which draws collected liquid phase through the liquid bypass pipes 20, 32 from the sump 18 (or weir 30) and into the reduced pressure section of the branch outlet pipe 14, 28.

The square root of the pressure drop created by the constriction is directly proportional to mass rate of vapor. The mass flow rate of liquid flowing through the liquid bypass pipe is also a function of the square root of the pressure drop created by the flow constrictions 16, 38. Thus the flow rate of liquid entering the reduced diameter branch outlet is directly proportional to the vapor flow rate in the reduced diameter branch outlet (by virtue of the fact that the flow of liquid in the bypass pipe will come to a rate at which the friction pressure drop in the liquid bypass pipe is equal to the pressure drop incurred by the vapor in its passage through the restriction). The result is a system which is self compensating with respect to changes in the vapor extraction ratio. If desired, the proportion of the liquid phase entering each branch can be controlled by either varying the diameter of the flow constriction or by adjusting valve means (not shown) located on the bypass pipe.

The present invention is unique in many of the following ways. For example, it is the only phase splitting mitigation device which is designed to be applied specifically to reduced diameter branching T-junctions. It does not require the use of an inline separator; only a means by which a portion of the liquid phase can be accumulated. The device causes little or no pressure reduction in the straight through run of the T-junction. Other known devices (such as those mentioned above) use flow constrictions which impart pressure losses in both outlets of the T-junction. The present invention can be very easily retro-fitted to existing piping systems without the need for pipe diameter changes. This is also a low cost phase splitting mitigation device. Its installation is less expensive than retrofitting branch T-junctions with impact T-junctions.

The present invention may be subject to many modifications and changes, which will be apparent to those skilled in the art, without departing from the spirit or essential characteristics thereof. The present embodiment is therefore to be considered in all respects as illustrative and not restrictive of the scope of the invention as defined by the appended claims.

We claim:

1. A method to substantially eliminate phase splitting of two phase fluid at a branch T-junction having a larger diameter straight through run pipe and branch pipe and, where the diameter of the branch pipe is smaller than the straight-through run of the junction, comprising the steps of:
   providing a flow restriction in the branch pipe of said branch T-junction;
   providing means to trap at least a portion of the liquid phase of said fluid in the vicinity of said branch T-junction in said straight through run pipe;
   providing a bypass pipe from said trap means to said branch pipe downstream of said flow restriction in said branch pipe;
   flowing a vapor-liquid fluid through said branch T-junction and allowing a fraction of the liquid phase to collect in said trap means where it will flow, by aspiration, back into the vapor flowing into the branch pipe of the T-junction in proportion to the mass of vapor flowing through the branch pipe of the T-junction.

2. A method according to claim 1 wherein said trap means is a sump.

3. A method according to claim 1 wherein said trap means is a weir.

4. A method according to claim 1 wherein said flow restriction means is an orifice plate.

5. An apparatus for assuring homogeneous flow of liquid-vapor mixture fluids through the arms of a reducing branch T-junction comprising:
   a branch T-junction having a straight-through main pipe of large diameter and a branch pipe of smaller diameter connected to and extending off substantially perpendicular to the main pipe;
   flow restricting means in the branch pipe which flow restricting means causes a pressure reduction in the branch pipe downstream of said flow restricting means;
   trap means causing a portion of the liquid phase of the fluid to accumulate in a bottom portion of the main pipe;
   bypass pipe means connected to said main pipe at said trap means and to said branch pipe downstream of said flow restricting means for conducting a fraction of said accumulated liquid phase from the main pipe of the T-junction into the lower pressure portion of the branch pipe of the T-junction downstream of said restriction means, whereby the fraction of liquid phase so conducted is in proportion to the amount of vapor flowing through the branch outlet of the T-junction.

6. The apparatus according to claim 5 wherein said trap means is a sump.

7. The apparatus according to claim 5 wherein said trap means is a weir.

8. The apparatus according to claim 5 wherein said flow restricting means is an orifice plate.

* * * * *